(12) United States Patent
Horimoto et al.

(10) Patent No.: US 7,418,587 B2
(45) Date of Patent: Aug. 26, 2008

(54) COMPOUND COMPUTER MACHINE AND MANAGEMENT METHOD OF COMPOUND COMPUTER MACHINE

(75) Inventors: Kazuhide Horimoto, Hachioji (JP); Takashige Baba, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 303 days.

(21) Appl. No.: 11/312,418

(22) Filed: Dec. 21, 2005

(65) Prior Publication Data

US 2006/0236082 A1 Oct. 19, 2006

(30) Foreign Application Priority Data

Apr. 19, 2005 (JP) ............................. 2005-120486

(51) Int. Cl.
  G06F 9/00 (2006.01)
  G06F 15/177 (2006.01)
(52) U.S. Cl. ................................. 713/1; 713/2; 713/100
(58) Field of Classification Search ...................... 713/1
  See application file for complete search history.

(56) References Cited

U.S. PATENT DOCUMENTS

2003/0069960 A1* 4/2003 Symons et al. .............. 709/224
2003/0232598 A1* 12/2003 Aljadeff et al. ............. 455/41.2
2005/0055427 A1* 3/2005 Frutiger et al. .............. 709/220
2006/0242438 A1* 10/2006 Baba et al. .................. 713/300

FOREIGN PATENT DOCUMENTS

JP 2002-032153 1/2002

* cited by examiner

*Primary Examiner*—Rehana Perveen
*Assistant Examiner*—Michael J Brown
(74) *Attorney, Agent, or Firm*—Mattingly, Stanger, Malur & Brundidge, PC

(57) ABSTRACT

A compound computer machine in which a plurality of modules are installed in one casing and in which trouble of management in combining modules to construct a computer machine is reduced. In the compound computer machine including a processor module; a component module which is combined with the processor module to construct a computer machine; and a management module which manages the processor module and the component module, the management module has module combination constraint information and priority information for constructing the computer machine, prepares installation information of the compound computer machine on receiving a request for constructing the computer machine, thereafter prepares module combination candidate information from the constraint information, and adds priority to the combination candidate information in a case where there exists the priority information to manage the constructions of the modules.

17 Claims, 24 Drawing Sheets

| REQUEST No. | REQUEST | MODULES FOR USE | CONSTRUCTION CLASS |
|---|---|---|---|
| 1 | CONSTITUTE THREE SERVERS | PROCESSOR MODULES 1,2,3 | CONSTRUCT FROM PRESENT SITUATION |

FIG.4

| MODULE INFORMATION | | |
|---|---|---|
| PROCESSOR MODULE 1 | PROCESSOR MODULE 2 | PROCESSOR MODULE 3 |
| PROCESSOR MODULE 5 | PROCESSOR MODULE 7 | PROCESSOR MODULE 8 |
| I/O MODULE 1 | POWER SUPPLY MODULE 1 | POWER SUPPLY MODULE 2 |
| POWER SUPPLY MODULE 3 | SWITCH MODULE 1 | MANAGEMENT MODULE 1 |

| REQUEST No. | MODULE COMBINATION |
|---|---|
| 1 | PROCESSOR MODULE 1 AND I/O MODULE SLOTS 1,2<br>PROCESSOR MODULE 2 AND I/O MODULE SLOTS 3,4<br>PROCESSOR MODULE 3 AND I/O MODULE SLOTS 5,6<br>COOLING FAN MODULES 1,2<br>POWER SUPPLY MODULES 1,2,3<br>SWITCH MODULE PORTS 1,2,3 |

| REQUEST No. | MODULE COMBINATION | ORDER OF RECOMMENDATION |
|---|---|---|
| 1 | PROCESSOR MODULE 1 AND I/O MODULE SLOTS 1,2<br>PROCESSOR MODULE 2 AND I/O MODULE SLOTS 3,4<br>PROCESSOR MODULE 3 AND I/O MODULE SLOTS 5,6<br>COOLING FAN MODULES 1,2<br>POWER SUPPLY MODULES 1,2,3<br>SWITCH MODULE PORTS 1,2,3 | 1 |

| | PROCESSOR MODULE 1 4311 | PROCESSOR MODULE 2 4312 | PROCESSOR MODULE 3 4313 | PROCESSOR MODULE 4 4314 | PROCESSOR MODULE 5 4315 | PROCESSOR MODULE 6 4316 | PROCESSOR MODULE 7 4317 | PROCESSOR MODULE 8 4318 | JUDGEMENT OF SMP CONSTRUCTION 4319 |
|---|---|---|---|---|---|---|---|---|---|
| | PRESENT | PRESENT | ABSENT | ABSENT | ABSENT | ABSENT | ABSENT | ABSENT | POSSIBLE OF CONSTRUCT |
| | PRESENT | ABSENT | PRESENT | ABSENT | ABSENT | ABSENT | ABSENT | ABSENT | POSSIBLE OF CONSTRUCT |
| | PRESENT | ABSENT | ABSENT | PRESENT | PRESENT | ABSENT | ABSENT | ABSENT | POSSIBLE OF CONSTRUCT |
| | PRESENT | ABSENT | ABSENT | ABSENT | PRESENT | ABSENT | ABSENT | ABSENT | IMPOSSIBLE OF CONSTRUCT |

| No. | COMBINATION OF NDC |
|---|---|
| 1 | NDC64A+NDC64A |
| 2 | NDC64A+NDC64B |
| 3 | NDC64B+NDC64B |
| 4 | NDC64A+NDC64A+NDC64A |

FIG.11

| No. | COMBINATION OF PROCESSORS |
|---|---|
| 1 | 64bitCPU-A(1.4GHz L3/4MB) + 64bitCPU-A(1.4GHz L3/4MB) |
| 1 | 64bitCPU-A(1.5GHz L3/6MB) + 64bitCPU-B(1.6GHz L3/9MB) + 64bitCPU-B(1.6GHz L3/9MB) |
| ... | ... |

4331 — No.
4332 — COMBINATION OF PROCESSORS
433

FIG.12

| PROCESSOR MODULE COMBINATION | EVALUATION OF VENDOR VALIDATION | NUMBER OF ACTIVATION | NUMBER OF DEACTIVATION | NUMBER OF NORMAL DEACTIVATION | RUNNING TIME |
|---|---|---|---|---|---|
| 11+12 | 10 | 1 | 0 | 0 | 0.1 |
| 11+13 | 2 | 3 | 3 | 3 | 2160 |
| 11+14 | 2 | 0 | 0 | 0 | 0 |
| ... | ... | ... | ... | ... | ... |

| No. | PERFORMANCE | TEMPERATURE | OTHERS |
|---|---|---|---|
| 1 | 100 | 10 | 10 |
| 2 | 150 | 25 | 1 |

| REQUEST No. | REQUEST | MODULE FOR USE | CONSTRUCTION CLASS |
|---|---|---|---|
| 1 | 2 PROCESSOR MODULE SMP | PROCESSOR MODULE 1 | CONSTRUCT FROM PRESENT SITUATION |

| PROCESSOR MODULE | CPU 1 | CPU 2 | PRESENTLY RELATED MODULE |
|---|---|---|---|
| 1 | 64bitCPU-B 1.6GHz L3/9MB | 64bitCPU-B 1.6GHz L3/9MB | NONE |
| 2 | 64bitCPU-B 1.6GHz L3/9MB | 64bitCPU-B 1.6GHz L3/9MB | NONE |
| 3 | NONE | NONE | NONE |
| 4 | 64bitCPU-A 1.4GHz L3/4MB | NONE | NONE |
| 5 | 64bitCPU-B 1.6GHz L3/9MB | 64bitCPU-B 1.6GHz L3/9MB | PROCESSOR MODULE 6 |
| 6 | 64bitCPU-B 1.6GHz L3/9MB | 64bitCPU-B 1.6GHz L3/9MB | PROCESSOR MODULE 5 |
| 7 | 32bitCPU-A 3.6GHz | 32bitCPU-A 3.6GHz | NONE |
| 8 | 64bitCPU-A 1.4GHz L3/4MB | NONE | NONE |

FIG.16

| REQUEST No. | MODULE COMBINATION |
|---|---|
| 1 | PROCESSOR MODULES 11,12 |
| 1 | PROCESSOR MODULES 11,14 |

| REQUEST No. | MODULE COMBINATION | ORDER OF RECOMMENDATION |
|---|---|---|
| 1 | PROCESSOR MODULES 11,12 | 1 |
| 1 | PROCESSOR MODULES 11,14 | 2 |

| 4511 | 4512 SLOT 1 | 4513 SLOT 2 | 4514 SLOT 3 | 4515 SLOT 4 | 4516 SLOT 5 | 4517 SLOT 6 | 4518 SLOT 7 | 4519 SLOT 8 |
|---|---|---|---|---|---|---|---|---|
| NDC32A | 1 | 2 | – | – | – | – | – | – |
| NDC64A | 2 | 1 | – | – | – | – | – | – |
| NDC64A 2SETS | 2 | 1 | 4 | 3 | – | – | – | – |
| NDC64A 4SETS | 2 | 1 | 4 | 3 | 6 | 5 | 8 | 7 |

| 9311 REQUEST №. | 9312 REQUEST | 9313 MODULE FOR USE | 9314 CONSTRUCTION CLASS |
|---|---|---|---|
| 1 | CONSTRUCT SERVER CAPABLE OF USING 4 I/O PORTS | PROCESSOR MODULE 1 | ADD 1 MODULE TO CONSTRUCT |

| MODULE INFORMATION | | |
|---|---|---|
| PROCESSOR MODULE 11 | PROCESSOR MODULE 12 | MULTIPROCESSOR COMPUTER MACHINE 72 |
| MULTIPROCESSOR COMPUTER MACHINE 73 | I/O MODULE FOR EXTENSION I/O CARD 32 | |

| REQUEST No. | MODULE COMBINATION |
|---|---|
| 1 | PROCESSOR MODULES 3,4 AND SLOTS 1 TO 4 OF I/O MODULE FOR EXTENSION I/O CARD |

9331  9332  933

| ADD-IN CARD INSERTION POSITION IN PROCESSOR MODULE | CORRESPONDING I/O MODULE |
|---|---|
| SLOT 1 | I/O MODULE 1 |
| SLOT 2 | I/O MODULE 2 |
| SLOT 3 | I/O MODULE 3 |

471

4711 / 4712

| | I/O OUTPUT MODULE A (ETHERNET SWITCH) | I/O OUTPUT MODULE B (ETHERNET) | I/O OUTPUT MODULE C (FC SWITCH) |
|---|---|---|---|
| ADD-IN CARD A (ETHERNET) | 10 | 8 | IMPROPER |
| ADD-IN CARD B (ETHERNET) | 6 | 4 | IMPROPER |
| ADD-IN CARD C (FC) | IMPROPER | IMPROPER | 10 |

| REQUEST No. | REQUEST | MODULES FOR USE | CONSTRUCTION CLASS |
|---|---|---|---|
| 9411 | 9412 | 9413 | 9414 |
| 1 | DETECT IMPROPER INSTALLATION | NONE | CONSTRUCT FROM PRESENT SITUATION |

| PROCESSOR MODULE | SLOT 1 | SLOT 2 | SLOT 3 |
|---|---|---|---|
| 9421 | 9422 | 9423 | 9424 |
| 1 | ETHERNET | FIBER CHANNEL | ETHERNET |
| 2 | PCI-EXPRESS | VACANT | ETHERNET |

| I/O MODULE NUMBER 9431 | MODULE CLASS 9432 | SWITCH FUNCTION 9433 |
|---|---|---|
| 1 | ETHERNET | PRESENT |
| 2 | FIBER CHANNEL | PRESENT |
| 3 | ETHERNET | ABSENT |

| CANDIDATE No. 9441 | MODULE CONSTRUCTION 9442 |
|---|---|
| 1 | SLOT 1 OF PROCESSOR MODULE 2 IS IMPROPER |

| CANDIDATE No. 9451 | MODULE CONSTRUCTION 9452 | ORDER OF RECOMMENDATION 9453 |
|---|---|---|
| 1 | SLOT 1 OF PROCESSOR MODULE 2 IS IMPROPER | 1 |

945

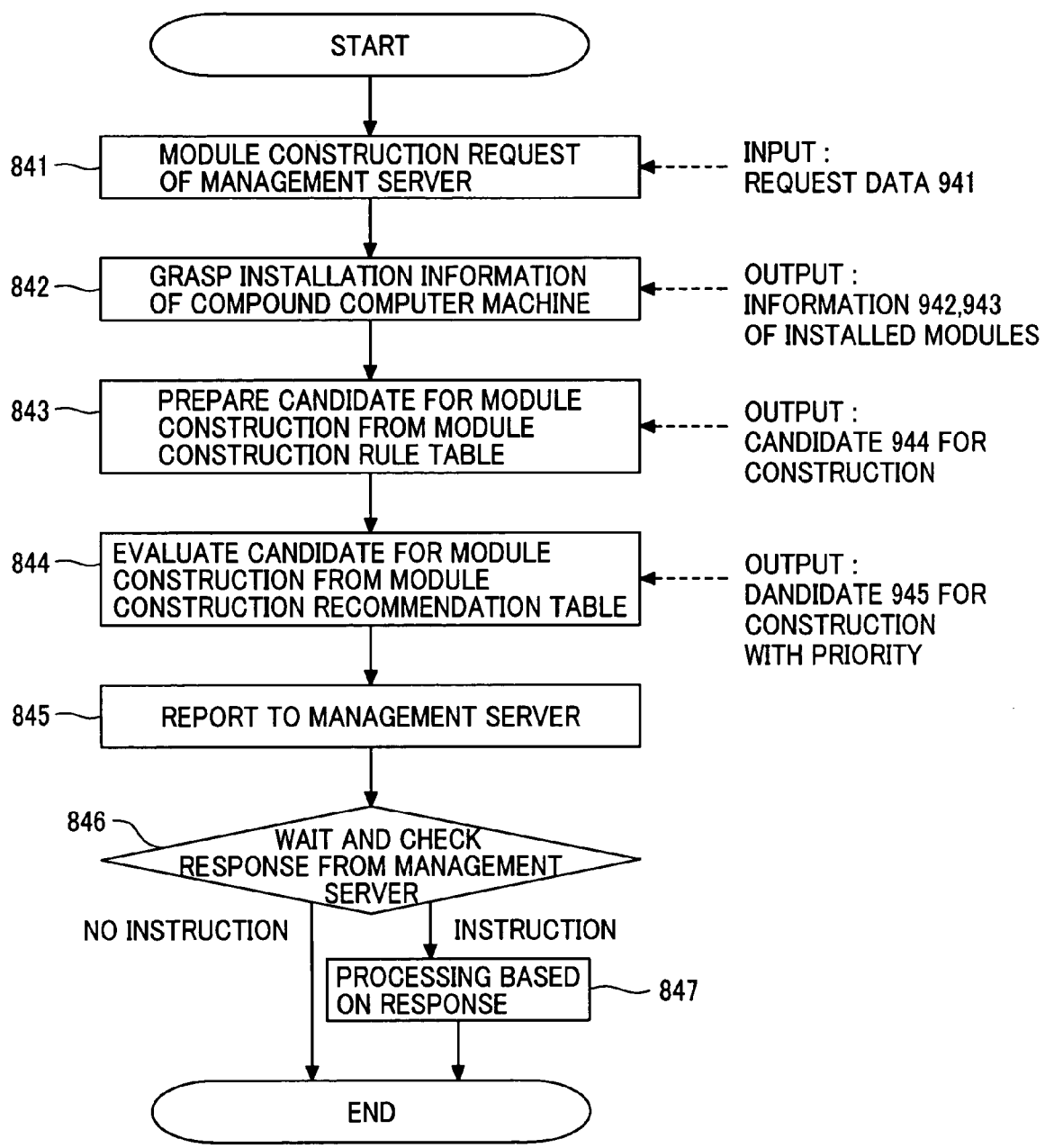

FIG.35

| PROCESSOR MODULE | SLOT 1 | SLOT 2 | SLOT 3 |
|---|---|---|---|
| 1 | ETHERNET | FIBER CHANNEL | ETHERNET |
| 2 | PCI-EXPRESS | VACANT | ETHERNET |

| I/O MODULE NUMBER | MODULE CLASS | SWITCH FUNCTION |
|---|---|---|
| 1 | ETHERNET | PRESENT |
| 2 | FIBER CHANNEL | PRESENT |
| 3 | ETHERNET | ABSENT |

| CANDIDATE No. | MODULE CONSTRUCTION |
|---|---|
| 1 | ADD TO SLOT 2 OF PROCESSOR MODULE 2 |
| 2 | ADD TO SLOT 2 OF PROCESSOR MODULE 4 |

| CANDIDATE No. | MODULE CONSTRUCTION | ORDER OF RECOMMENDATION |
|---|---|---|
| 1 | ADD TO SLOT 2 OF PROCESSOR MODULE 2 | 2 |
| 2 | ADD TO SLOT 2 OF PROCESSOR MODULE 4 | 1 |

955

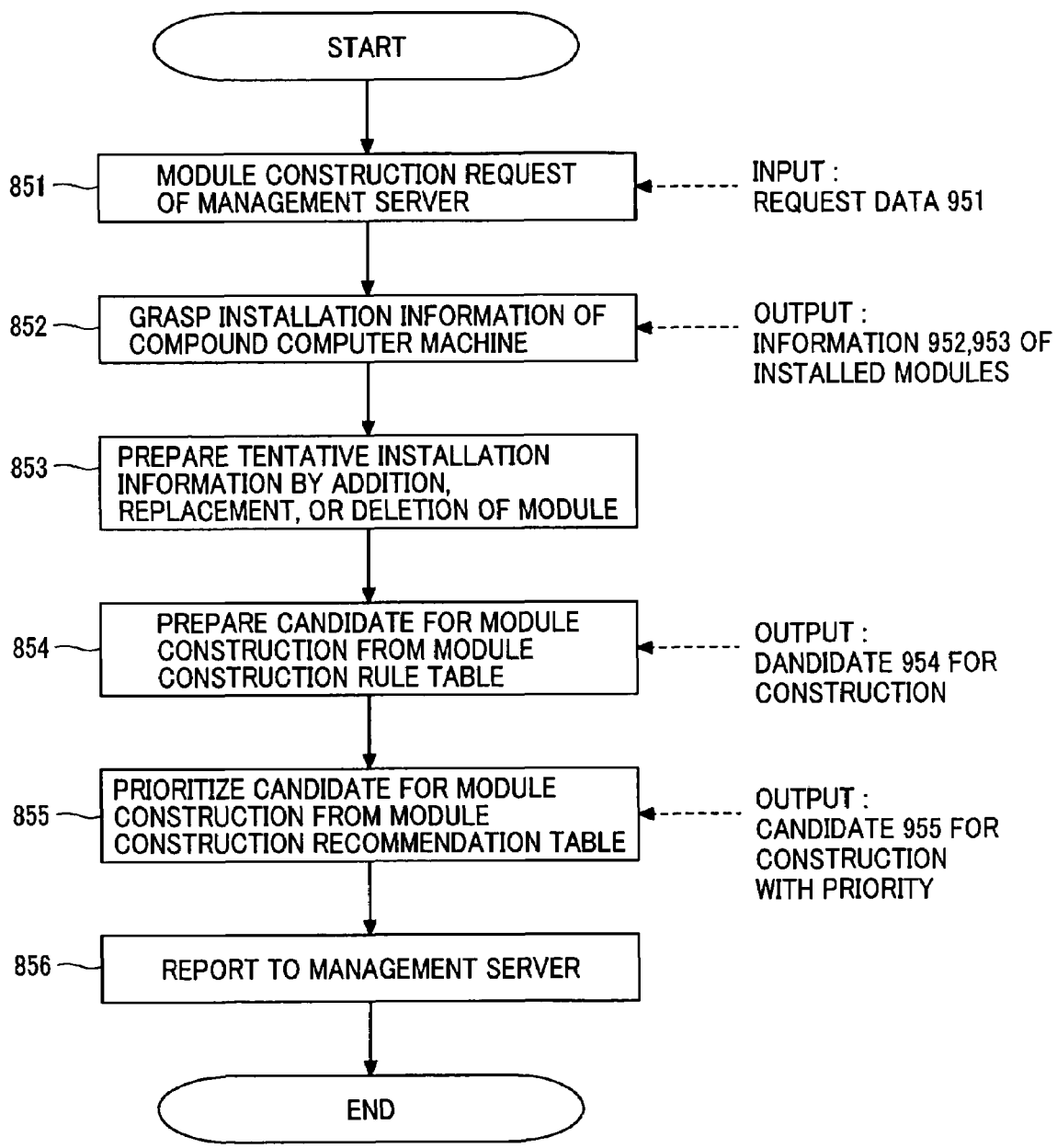

COMPOUND COMPUTER MACHINE AND MANAGEMENT METHOD OF COMPOUND COMPUTER MACHINE

INCORPORATION BY REFERENCE

The present application claims priority from Japanese application JP 2005-120486 filed on Apr. 19, 2005, the content of which is hereby incorporated by reference into this application.

BACKGROUND OF THE INVENTION

1. Field of the Invention

The present invention relates to a management technology which combines modules to construct a computer machine in a compound computer machine in which a plurality of modules are installed in one casing.

2. Description of the Related Art

A compound computer machine constituted of a processor, a memory, an IO device, a storage device and the like is used in a WEB server, an application server, or a database server in a business system for use in a corporation. In recent years, the compound computer machine has been used which aims at saving a space of the compound computer machine or disposing, integrating, and managing servers in one place in the system. As the compound computer machine, a blade server is well known. In this blade server, components of the computer machine such as a CPU, a memory, and an HDD are installed in a thin case called a CPU module or a CPU blade, and a plurality of CPU modules are installed in a case called a chassis or an enclosure to realize a high-density compound computer machine. Therefore, more space can be saved as compared with a conventional computer machine.

Moreover, in the blade server, when a power supply or a network switch is separated from the server, and shared, a highly functional operation such as replication can be performed. However, there appears a compound computer machine in which the server is divided into a module having the processor and the memory, a storage, and I/O to reduce construction components more than in a conventional blade server, and the highly-functional operation can be performed.

As to the compound computer machine constituted of such module components, since a large number of module combinations are possible, it is possible to flexibly meet requests of a processor resource, a storage resource, and an I/O resource.

In the compound computer machine, a management module generally exists in order to manage a large number of modules. A manager of the blade server accesses this management module via means such as telnet so that it is possible to manage an ON or OFF state of a power supply of the computer machine in the blade server. Furthermore, a management software is used which operates in an external computer machine of the blade server, that is, a so-called management server in order to manage the system including an operation system, an application or the like operating in the computer machine. This management server is connected to the above-described management module via a management network such as a local area network (LAN), and can communicate with the management module to thereby manage the ON or OFF state of the power supply of the computer machine in the blade server. This management server is connected to the individual computer machines in the blade server via the management network, and manages the operation system, the application or the like operating in the computer machine. It is general to use an agent software operating in the computer machine in the communication between the management software and the computer machine.

It is to be noted that this type of blade server is described in JP-A-2002-32153.

In the above-described compound computer machine, the modules can be installed and constructed with a high degree of freedom in order to make possible the operation which flexibly meets various requests. However, when the number of the present modules increases, an operation situation becomes complicated, and a lot of labor is required for the management of the compound computer machine.

As a known example to solve such problem, there is disclosed "Multipartition Computer System" in JP-A-2002-14939. In this known example, a service processor performs the management via a communication link in a multiprocessor computer system. However, in this system of the known example, when there is a restriction on a construction of the module of the compound computer machine, a lot of labor is required for the manager to grasp a management method, and it is difficult to manage the operation of the compound computer machine automatically.

SUMMARY OF THE INVENTION

An object of the present invention is to impart, to a management module, information for constructing a compound computer machine by modules in the above-described compound computer machine, thereby facilitating reduction of trouble of management or automation of the management.

The above-described and other objects and inventive characteristics of the present invention will be apparent from description and accompanying drawings of the present specification.

According to the present invention, there is provided a compound computer machine comprising: a processor module; a component module which is combined with the processor module to construct a computer machine; and a management module which manages the processor module and the component module.

The management module has module combination constraint information and priority information for constructing the computer machine, prepares installation information of the compound computer machine on receiving a request for constructing the computer machine, thereafter prepares module combination candidate information from the constraint information, and adds priority to the combination candidate information in a case where there exists the priority information.

There will be briefly described effects obtained by representative inventions among inventions disclosed in the present application.

In the compound computer machine, in a case where the modules are combined to construct the computer machine, even when there are a large number of installed modules or complicated construction constraints, the management module can obtain a candidate for the module construction which satisfies the request for constructing the module. Therefore, it is possible to save the trouble of the management of the module construction.

BRIEF DESCRIPTION OF THE DRAWINGS

FIG. 4 shows installation information of the compound computer machine in the management method according to Embodiment 1;

FIG. 5 shows candidate information of the module construction in the management method according to Embodiment 1;

FIG. 6 shows candidate information with priority for the module construction in the management method according to Embodiment 1;

FIG. 9 shows combination constraint information of a processor module in the management method according to Embodiment 2;

FIG. 10 shows NDC combination constraint information in the management method according to Embodiment 2;

FIG. 11 shows processor combination constraint information in the management method according to Embodiment 2;

FIG. 12 shows priority information corresponding to a processor module combination in the management method according to Embodiment 2;

FIG. 13 shows priority information corresponding to a processor combination in the management method according to Embodiment 2;

FIG. 14 shows information of the request for constructing the module in the management method according to Embodiment 2;

FIG. 15 shows installation information of the compound computer machine in the management method according to Embodiment 2;

FIG. 16 shows candidate information for the module construction in the management method according to Embodiment 2;

FIG. 17 shows candidate information with priority for the module construction in the management method according to Embodiment 2;

FIG. 20 shows combination constraint information in a management method according to Embodiment 3;

FIG. 21 shows information of a request for constructing a module in the management method according to Embodiment 3;

FIG. 22 shows installation information of a compound computer machine in the management method according to Embodiment 3;

FIG. 23 shows candidate information of the module construction in the management method according to Embodiment 3;

FIG. 28 shows information of a request for constructing a module in a case where there is not any change in module installation in the management method according to Embodiment 4;

FIG. 29 shows installation information of the compound computer machine in a case where there is not any change in the module installation in the management method according to Embodiment 4;

FIG. 30 shows the installation information of the compound computer machine in a case where there is not any change in the module installation in the management method according to Embodiment 4;

FIG. 31 shows candidate information of the module construction in a case where there is not any change in the module installation in the management method according to Embodiment 4;

FIG. 32 shows candidate information with priority for the module construction in a case where there is not any change in the module installation in the management method according to Embodiment 4;

FIG. 33 shows a flowchart of the management method according to Embodiment 4 in a case where a module to be installed is added;

FIG. 34 shows information of a request for constructing a module in a case where the module to be installed is added in the management method according to Embodiment 4;

FIG. 35 shows installation information of the compound computer machine in a case where the module to be installed is added in the management method according to Embodiment 4;

FIG. 36 shows the installation information of the compound computer machine in a case where the module to be installed is added in the management method according to Embodiment 4;

FIG. 37 shows candidate information for the module construction in a case where the module to be installed is added in the management method according to Embodiment 4;

FIG. 38 shows candidate information with priority for the module construction in a case where the module to be installed is added in the management method according to Embodiment 4; and FIG. 39 shows a flowchart of the management method of Embodiment 4 in a case where the module to be installed is added.

DESCRIPTION OF THE EMBODIMENT

Figure 1:
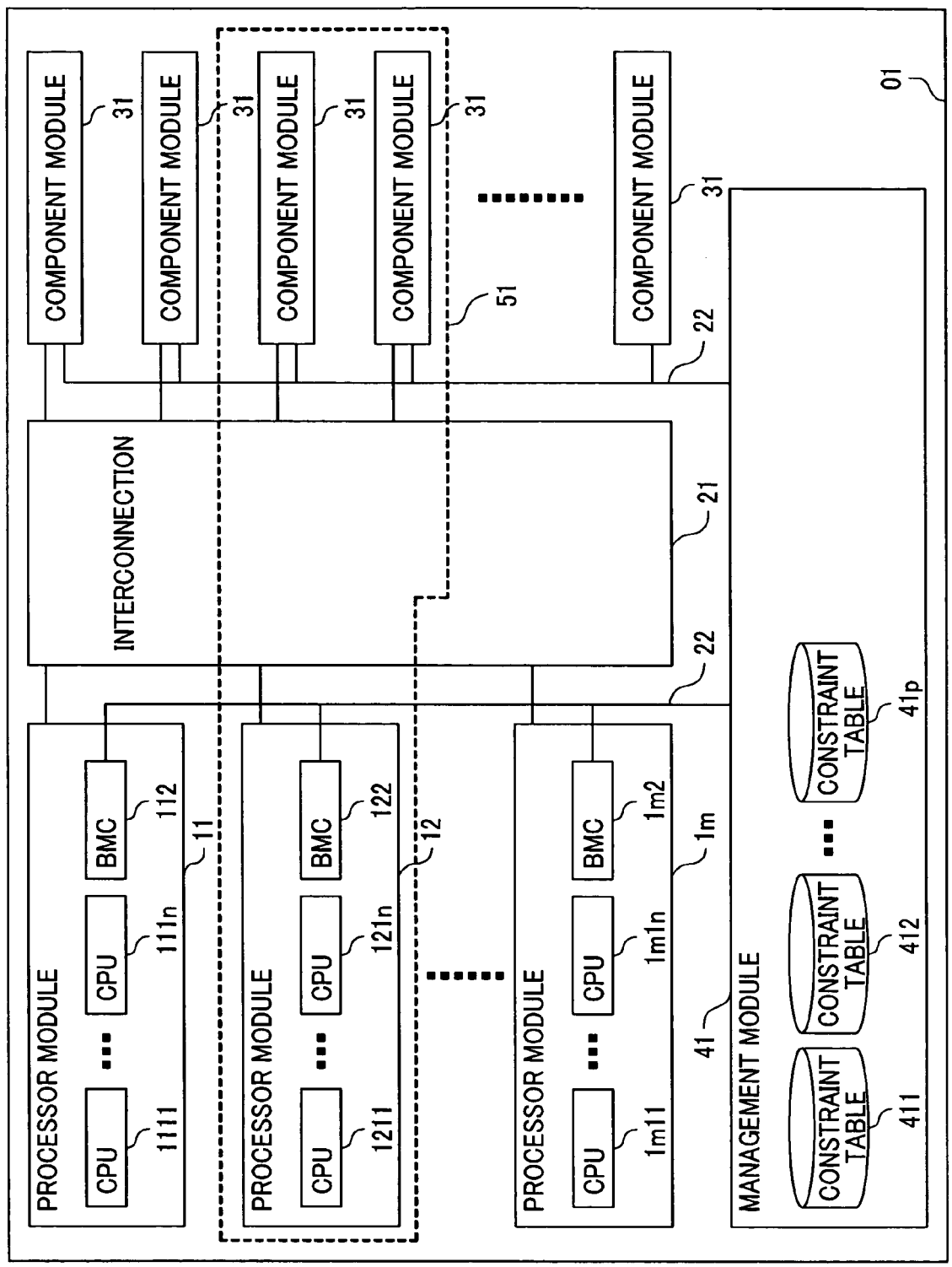
FIG. 1 shows a whole construction diagram of Embodiment 1 of the present invention.

Embodiments of the present invention will be described hereinafter in detail with reference to the drawings. It is to be noted that in the drawings showing the embodiments, the same members are denoted with the same reference numerals in principle, and redundant description thereof is omitted.

Embodiment 1

FIG. 1 shows a whole diagram of an embodiment in the present invention.

A compound computer machine 01 is constituted of processor modules 11 to 1m, a component module 31, and a management module 41. The processor module 11 includes central processing unit (CPU) slots 1111 to 111n and a baseboard management controller (BMC) 112. The CPU slots 1111 to 111n are positions into which a CPU is to be inserted. The BMC 112 is a controller which monitors an internal state of the processor module, and communicates with the management module 41 to report the CPU installed in the processor module, a temperature, or a power supply state. The processor modules 12 to 1m other than the processor module 11 have constructions similar to those of the processor module 11. The component module 31 has functions of a memory, storage, powers supply, cooling fan and the like, and is a generic module other than the processor module and the management module. The management module 41 has constraint tables 411 to 41p as combination constraint information on the constructions of the modules in the compound computer machine. The modules are combined in accordance with constraints in the constraint tables to construct the computer machine. The management module 41 is connected to the processor modules 11 to 1m and the component module 31 via an interconnection 22, and connected to all of the modules that are management objects in the compound computer machine. The interconnection 22 may be included in an interconnection 21, or separated. However, when the interconnection for the management is separated from that for another application, safety of the management is more easily secured. Therefore, the interconnection 22 is separated from the interconnection 21 in the present embodiment. In the present embodiment, the processor module 12 is combined with two component modules 31 to construct a computer machine 51.

The constraints on the constructing of the computer machines in the present embodiment are described in the constraint tables 411 to 41p present in the management module 41, and the tables have information on module classes or combinations. On receiving a construction request for combining the modules from an external management server or a manager of the compound computer machine 01, the management module 41 communicates with the processor modules 11 to 1m or the component module 31 via the interconnection 22 to grasp installation information of the compound computer machine 01. When the communication is performed via the interconnection 22 but there is not any response, the management module grasps that any module does not exist in a position connected via the interconnection 22 in the compound computer machine 01.

The computer machine 51 has a construction which satisfies the constraints of the constraint tables 411 to 41p present in the management module 41 of the compound computer machine 01. When there are items concerning cooling or power supply in the constraint, the management module 41 obtains as candidate information the number or positions of cooling modules or power supply modules to be operated from states of the modules operating in the whole compound computer machine 01. When there is an item concerning storage in the constraint, the management module 41 obtains as candidate information storages to be combined with the processor modules 11 to 1m, a storage module in the compound computer machine 01, and an external storage device.

Figures 2, 3:
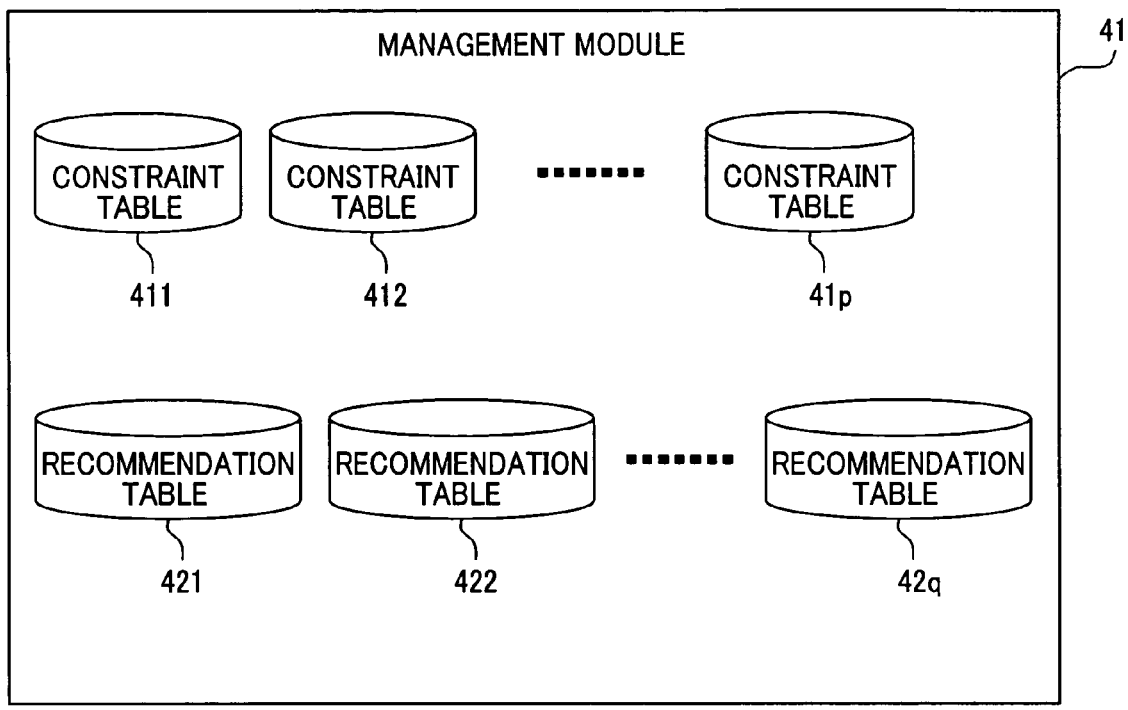
FIG. 2 is an explanatory view in a case where a management module disposed in a compound computer machine of FIG. 1 has priority information.
FIG. 3 shows information of a request for constructing a module in a management method according to Embodiment 1.

In the management module 41 of FIG. 2, the management module 41 shown in FIG. 1 has recommendation tables 421 to 42q as priority information. When the compound computer machine 01 has the recommendation tables 421 to 42q, candidate information for the module construction is prioritized.

Figure 7:
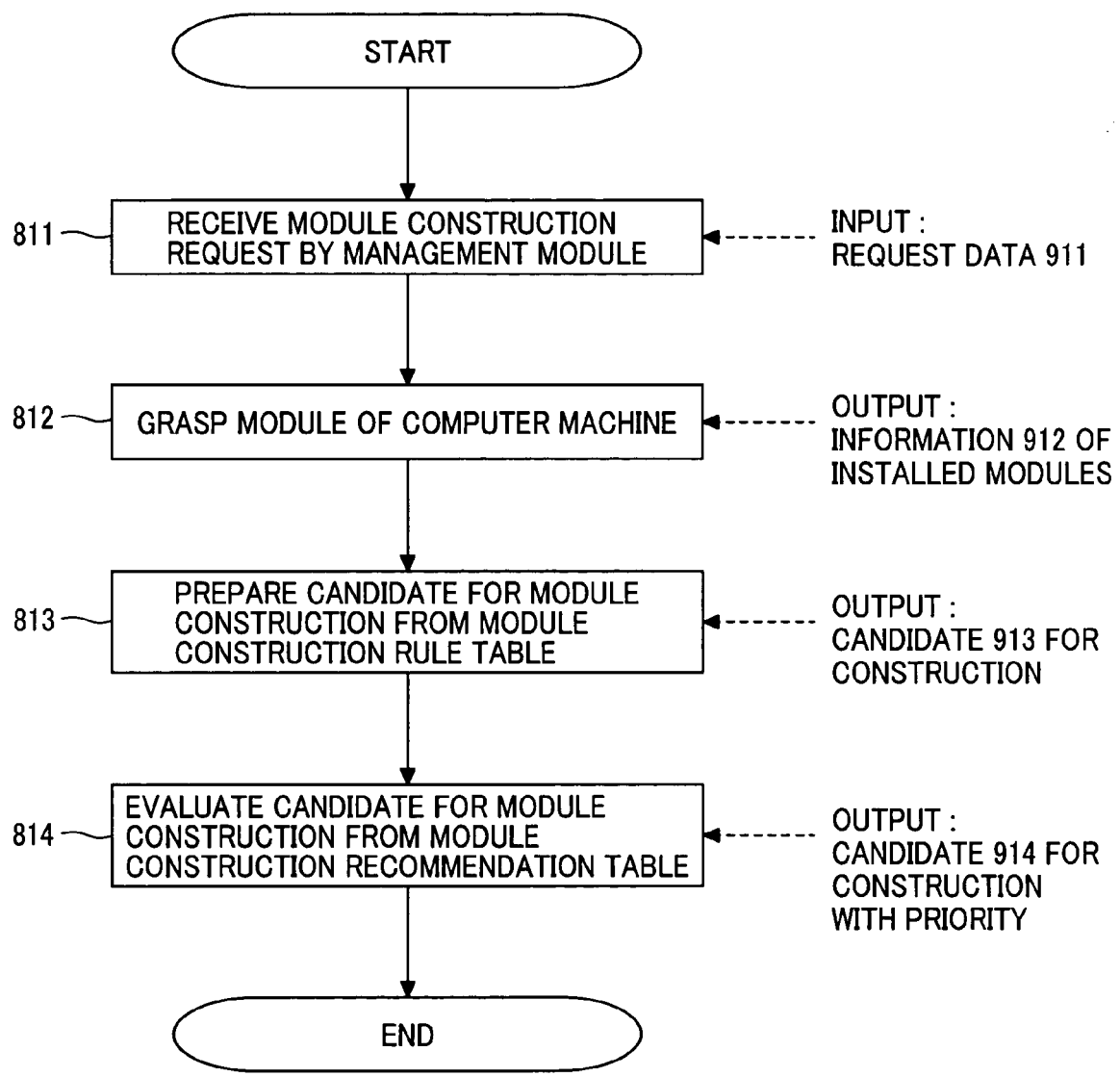
FIG. 7 shows a flowchart of the management method of Embodiment 1.

FIG. 7 is a flowchart from a time when the management module 41 receives a request for constructing the module until the module prepares prioritized candidate information.

Data 911 shown in FIG. 3 indicates an instruction for the module construction, and is sent to the management module 41. The data 911 is constituted of columns 9111 to 9114, and the column 9111 indicates numbers of module construction requests, and different numbers are assigned to the respective columns in a case where there are a plurality of requests. The column 9112 indicates the construction of the module in the compound computer machine 01, and the column 9113 indicates the constraint present in the request. The column 9114 indicates a construction class. The column indicates that the module is constructed from present situation, or has as a value a construction change involving addition, replacement, or deletion of the module. On receiving the data 911, the management module 41 performs a step 811 to prepare data 912. In the step 811, the management module 41 obtains installation information from the processor modules 11 to 1m and the component module 31 via the interconnection 22 in FIG. 1.

The data 912 shown in FIG. 4 is the installation information in the compound computer machine 01. After obtaining the data 912, the management module 41 performs a step 812 to prepare data 913. The step 812 is a step of obtaining, as information of candidate for construction, combinations of elements of the data 912 which satisfy the constraints with reference to the data 912 and the constraint tables 411 to 41p, and the obtained candidate information is the data 913.

The data 913 shown in FIG. 5 has columns 9131 and 9132. The column 9131 indicates numbers of module construction requests, and corresponds to the column 9111. The column 9132 indicates a candidate for module combination. In the data 913 of FIG. 5, the processor modules are combined with input/output (I/O) modules to construct three computer machines, and there are used two cooling fan modules, three power supply modules, and three switch module ports required for operating the machines at minimum. When the management module 41 obtains the data 913, the module performs a step 813 to prepare data 914. The step 813 is a step of prioritizing candidate information by use of evaluation standards of the recommendation tables with reference to the data 913 and the recommendation tables 421 to 42q. The data 914 is obtained by adding priorities to the candidate information.

The data 914 shown in FIG. 6 is constituted of columns 9141 to 9143. The column 9141 corresponds to the column 9111. The column 9142 has the same contents as those of the column 9132. The column 9143 indicates priority information. Accordingly, the management module absorbs the constraint on the compound computer machine, so that the modules can be easily constructed.

Embodiment 2

Figure 8:
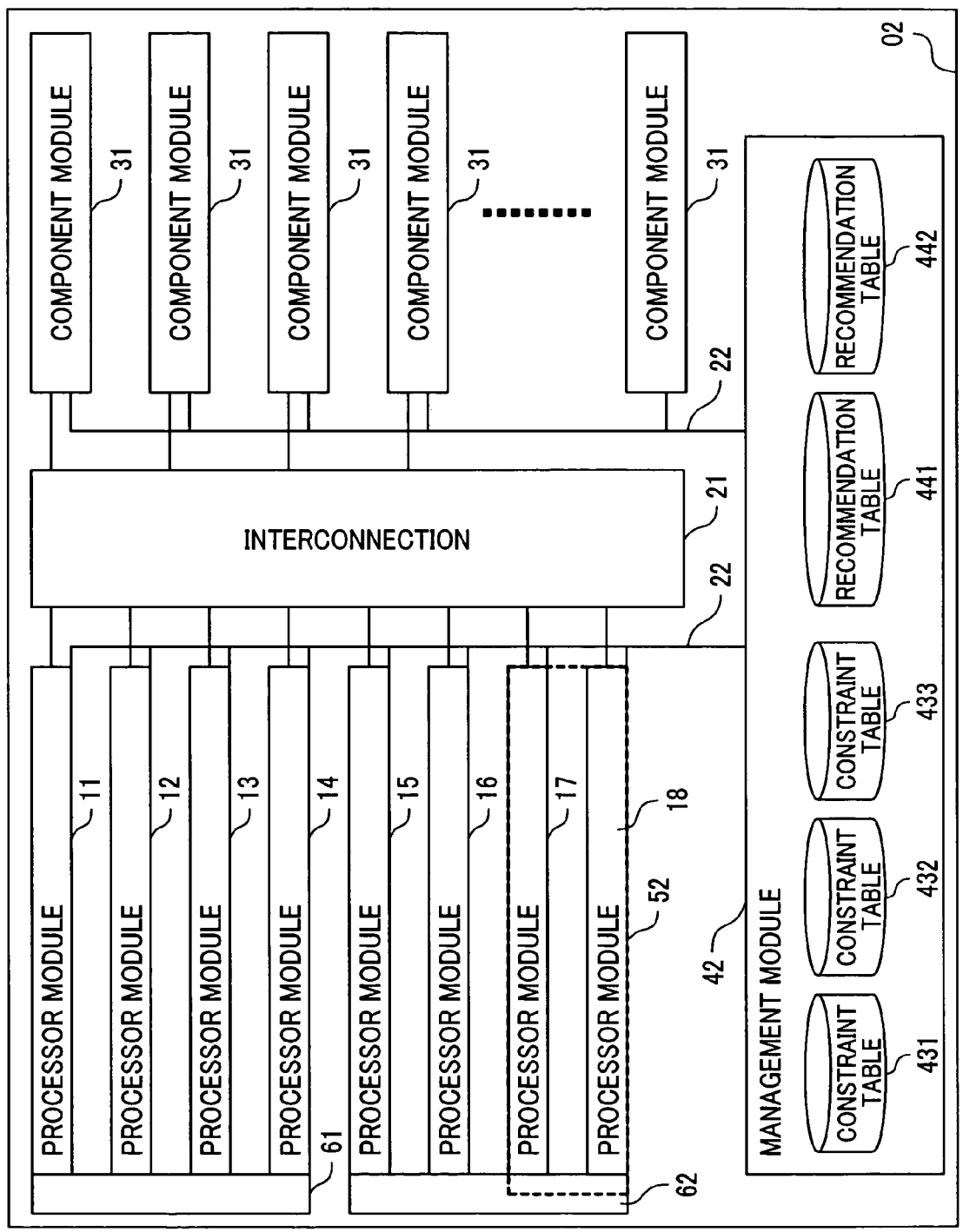
FIG. 8 shows a whole construction diagram of Embodiment 2 of the present invention.

FIG. 8 shows a whole diagram of Embodiment 2 in the present invention.

In Embodiment 2, there will be described a case where multiprocessor computer machines constituted by combining two or more of processor modules 11 to 18 can be handled in the same manner as in one processor module in a compound computer machine 02. The insides of the processor modules 11 to 18 are omitted from FIG. 8, but they are the same as those of the processor modules 11 to 1m shown in FIG. 1 in a case where the number of CPUs is n=2. In addition to the construction of the compound computer machine 01, the compound computer machine 02 has signal interconnections 61 and 62 for physically or logically connecting the processor modules to one another. In multiprocessor computer machines 52, the processor module 17 is connected to the processor module 18 via the signal interconnection 62. A management module 42 has, as module construction information, especially constraint tables 431 to 433 indicating combination constraint information on connections of the processor modules 11 to 18 and recommendation tables 441 and 442 indicating priority information.

FIG. 9 corresponds to the constraint table 431, FIG. 10 corresponds to the constraint table 432, FIG. 11 corresponds to the constraint table 433, FIG. 12 corresponds to the recommendation table 441, and FIG. 13 corresponds to the recommendation table 442.

The table 431 shown in FIG. 9 has columns 4311 to 4319, and indicates constraints on combining of eight processor modules 11 to 18 to construct multiprocessor computer machines. In the present embodiment, since the processor modules 11 to 18 also indicate position information in the compound computer machine 02, the table 431 indicates the constraints on the combination of the positions. The columns 4311 to 4318 indicate the presences of the processor modules, respectively, and the column 4319 has combination constraint information indicating whether or not a symmetric multiprocessor (SMP) construction as a construction of the multiprocessor computer machines is possible by means of the combinations of the columns 4311 to 4318.

Figure 19:
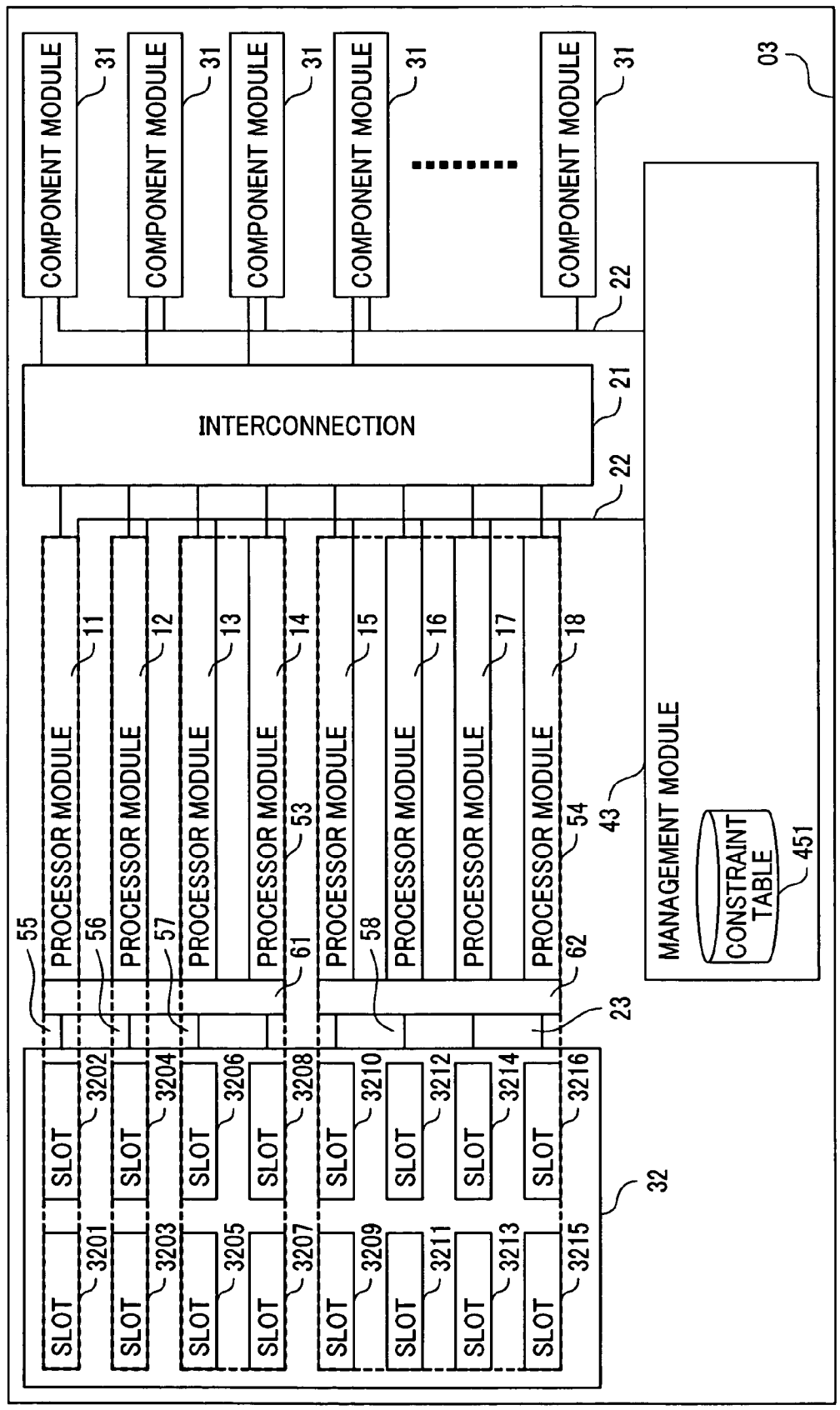
FIG. 19 shows a whole construction diagram of Embodiment 3 of the present invention.

The table 432 shown in FIG. 19 has columns 4321 and 4322. The column 4321 indicates serial numbers in the table 432. The column 4322 has combination constraint information indicating combinations of classes of NDC capable of constructing SMP with respect to controller NoDe controller (NDC) which executes a control between processors present in the processor modules.

The table 433 shown in FIG. 11 has columns 4331 to 4333, and has combination constraint information indicating combinations of processor classes capable of constructing SMP constructions. The column 4332 indicates the number corresponding to the column 4321. The column 4333 is the combination constraint information indicating a combination of classes of processors capable of constructing the SMP construction with respect to each NDC indicated by the number of the corresponding column 4321.

The table 441 shown in FIG. 12 has columns 4411 to 4415, and is combination constraint information indicating evaluation of recommendation with respect to the combinations of the processor modules. The column 4411 corresponds to the combinations of the processor modules shown in the table 431. The column 4412 indicates an evaluation value of each combination in the column 4411 validated by a vendor of the management modules. The number of actual activations of the individual components of the compound computer machine 02 in the combination shown in the column 4411 is each value shown in the column 4413, the number of normal deactivations is each value shown in the column 4414, and a running time is each value shown in the column 4415.

The table 442 shown in FIG. 13 has columns 4421 to 4424. The column 4421 indicates values corresponding to those of the column 4331. The column 4422 indicates performances validated by the vendor of the management module 42, the column 4423 indicates priority information by means of a temperature validated by the vendor of the management module 42, and the column 4424 indicates another overall priority information validated by the vendor of the management module 42.

FIG. 14 shows data 921 of module construction requests received by the management module, and has columns 9211 to 9214. The column 9211 indicates serial numbers of the data 921. The column 9212 indicates each construction of the module in the compound computer machine 02, and the column 9213 shows constraints on the requests. The column 9214 indicates construction classes, has a value indicating that the module is constructed from present situations, and also has values of construction changes involving addition, replacement, and deletion of the module.

Data 922 shown in FIG. 15 is information of processor modules in the compound computer machine 02, and has columns 9221 to 9224. The column 9221 indicates numbers of processor modules. As to the processor module 11 as an example, the column 9222 indicates classes of CPUs present in the CPU slot 1111 which is the first CPU slot. As to the processor module 11 as the example, the column 9223 indicates classes of CPUs present in the CPU slot 1112 which is the second CPU slot. The column 9224 indicates a related module in a case where the processor module is related to the construction of the computer machine or the processor module.

Data 923 shown in FIG. 16 is data indicating candidates for the module construction, and has columns 9231 to 9232. The column 9231 indicates the numbers corresponding to those of the column 9211. The column 9232 indicates combinations of the processor modules 11 to 18 capable of constructing the multiprocessor modules requested by the data 921.

Data 924 shown in FIG. 17 is obtained by attaching priority information to the candidates for the module construction of the data 923, and has columns 9241 to 9243. The column 9241 indicates the numbers corresponding to those of the column 9211. The column 9242 indicates combinations of the processor modules 11 to 18 capable of constructing the multiprocessor modules requested by the data 921. The column 9243 is priority information on the candidates indicated by the data 923 based on the recommendation tables 441 and 442.

Figure 18:
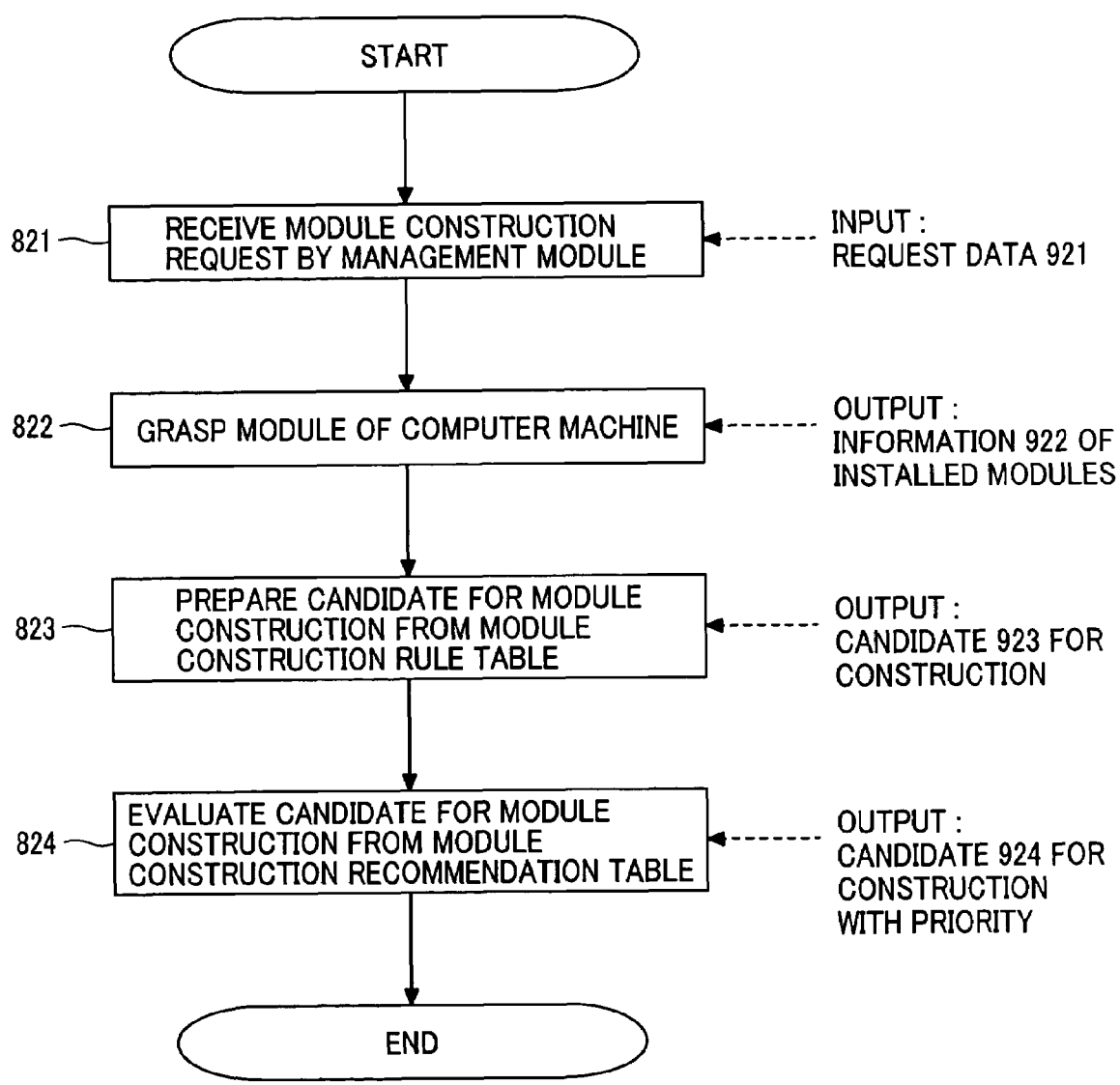
FIG. 18 shows a flowchart of the management method of Embodiment 2.

FIG. 18 is a flowchart from a time when the management module 42 receives a request for constructing the module until the module prepares candidates provided with priority information. The data 921 indicates an instruction for the module construction, and is sent to the management module 42. On receiving the data 921, the management module 42 performs a step 821 to prepare the data 922. In the step 821, the management module 42 obtains information from the processor modules 11 to 18 and the component module 31 via the interconnection 22. On obtaining the data 922, the management module 42 performs a step 822 to prepare data the 923. The step 822 is a step of obtaining, as candidates for construction, combinations of elements of the data 922 which satisfies the constraint with reference to the data 922 and the constraint tables 431 to 433, and the obtained candidates are the data 923. On obtaining the data 923, the management module 42 performs a step 823 to prepare the data 924. The step 823 is a step of prioritizing candidate information by use of the priority information with reference to the data 923 and the recommendation tables 441 to 442.

When the data 921 is transmitted as a request to the management module 42, the management module 42 inquires of the installation information in the compound computer machine 02 to prepare the data 922. Thereafter, the module extracts data which satisfies the constraints of the constraint tables 431 to 433 from the data 921 and 922 to prepare the data 923. The management module 42 adds the priority information from the corresponding items of the recommendation tables 441 and 442 to the respective items of the data 923 to prepare the data 924.

Consequently, the management module absorbs the constraints on the constructing of the multiprocessor computer machines of the compound computer machine, so that the modules can be easily constructed.

Embodiment 3

FIG. 19 shows a whole diagram of Embodiment 3 in the present invention.

In Embodiment 3, there will be described a case where slots 3201 to 3216 for extension I/O cards of an I/O module 32 for the extension I/O cards can be assigned to processor modules 11 to 18 or multiprocessor computer machines 53 and 54 in a compound computer machine 03. The insides of the processor modules 11 to 18 are omitted from FIG. 19, but they are constituted to be the same as those of the processor modules 11 to 1m shown in FIG. 1. In addition to the construction of the compound computer machine 02, the compound computer machine 03 has an interconnection 23 for assigning the I/O module 32 for the extension I/O cards and the slots 3201 to 3216 for the extension I/O cards to the processor modules. An extension processor computer machine 55 assigns the slots 3201 and 3202 for the extension I/O cards to the processor module 11, an extension processor computer machine 56 assigns the slots 3203 and 3204 for the extension I/O cards to the processor module 12, an extension processor computer machine 57 assigns the slots 3205 to 3208 for the extension I/O cards to the multiprocessor computer machine 53, and an extension processor computer machine 58 assigns the slots 3209 to 3216 for the extension I/O cards to the multiprocessor computer machine 54. A management module 43 has, as module construction information, a constraint table 451 indicating combination constraint information especially on the processor modules or the multiprocessor computer machines and the slots for the extension I/O cards.

FIG. 20 shows a constraint table 451. The 451 has columns 4511 to 4519, and shows numbering of the slots for the extension I/O cards with respect to the processor modules or the multiprocessor computer machines and the slots for the extension I/O cards assigned to the modules or the machines. The column 4511 shows classes of the processor modules or the multiprocessor computer machines. The columns 4512 to 4519 show each number associated with the slot for the extension I/O card at a time when the processor module or the multiprocessor computer machine and the slot for the extension I/O card of the column 4511 construct the extension processor computer machine.

FIG. 21 shows data 931 showing a request to the management module 43. The data 931 has columns 9311 to 9314, and is a request for the I/O module for the extension I/O card to assign the slot for the extension I/O card to the processor module or the multiprocessor computer machine. The column 9311 shows a serial number of the data 931. The column 9312 shows a request for constructing the module. The column 9133 limits the module to be used for the request for constructing the module. The column 9314 shows a class of the module construction request such as no change in installation, addition, deletion, or replacement.

FIG. 22 shows data 932 showing module installation information of the compound computer machine 03.

FIG. 23 shows data 933 of a candidate for the module construction, generated by the management module 43. The data 933 has columns 9331 and 9332. The column 9331 shows numbers corresponding to those of the column 9311. The column 9332 shows candidates for the module construction.

Figure 24:
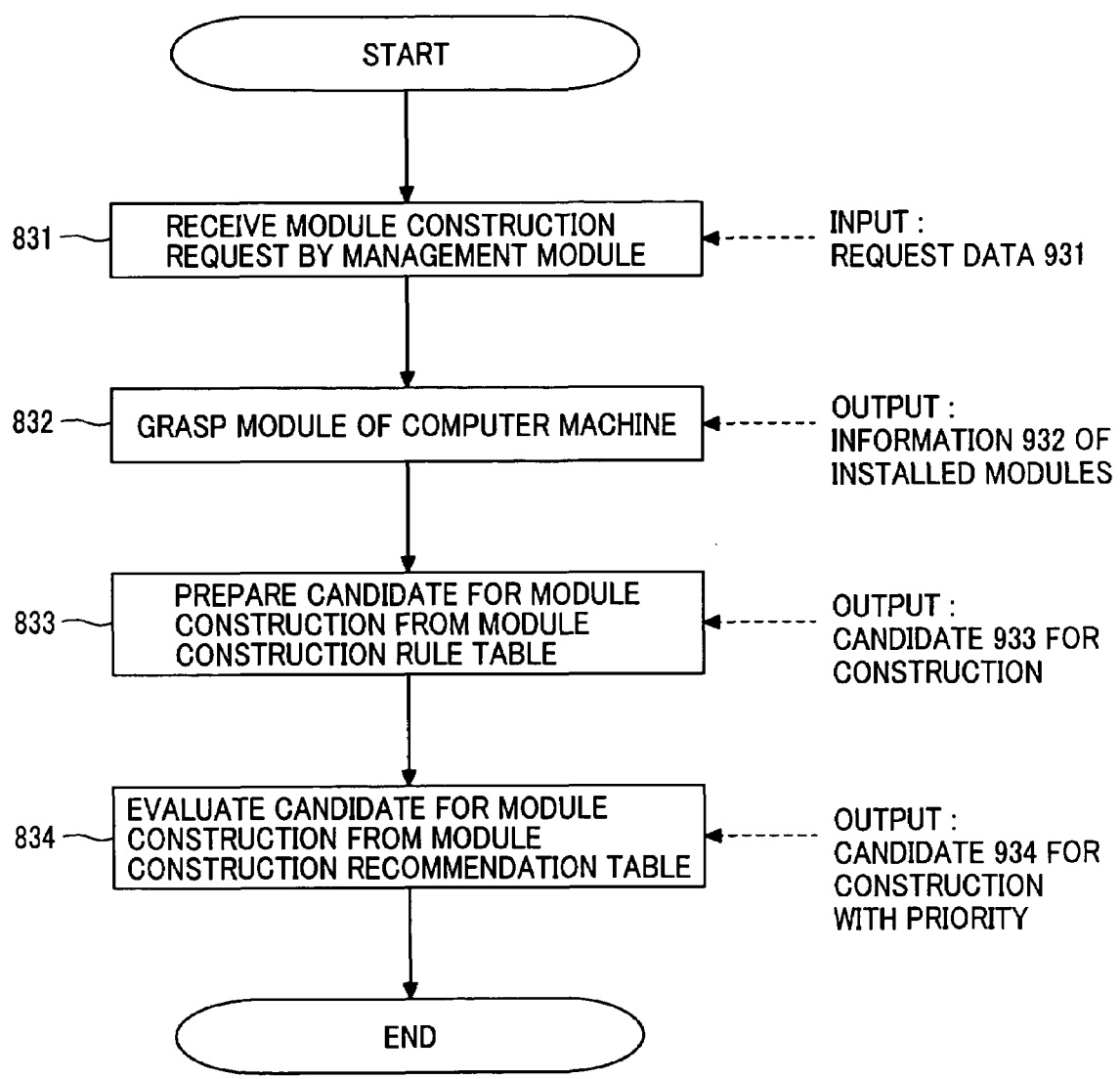
FIG. 24 shows a flowchart of the management method of Embodiment 3.

FIG. 24 shows a management method in Embodiment 3, and shows a flow from a time when the management module 43 receives the request data 931 until the module prepares the candidate data 933. On receiving the data 931, the management module 43 communicates with the module installed in the compound computer machine 03 via the interconnection 22 in a step 831, grasps the installation information, and prepares the data 932 in a step 832. On receiving the data 932, the management module 43 prepares the candidate data 933 for the module construction with reference to the constraint table 451 in a step 833.

Consequently, the management module absorbs the constraint on the constructing of the extension processor computer machine of the compound computer machine, so that the module can be easily constructed.

Embodiment 4

Figure 25:
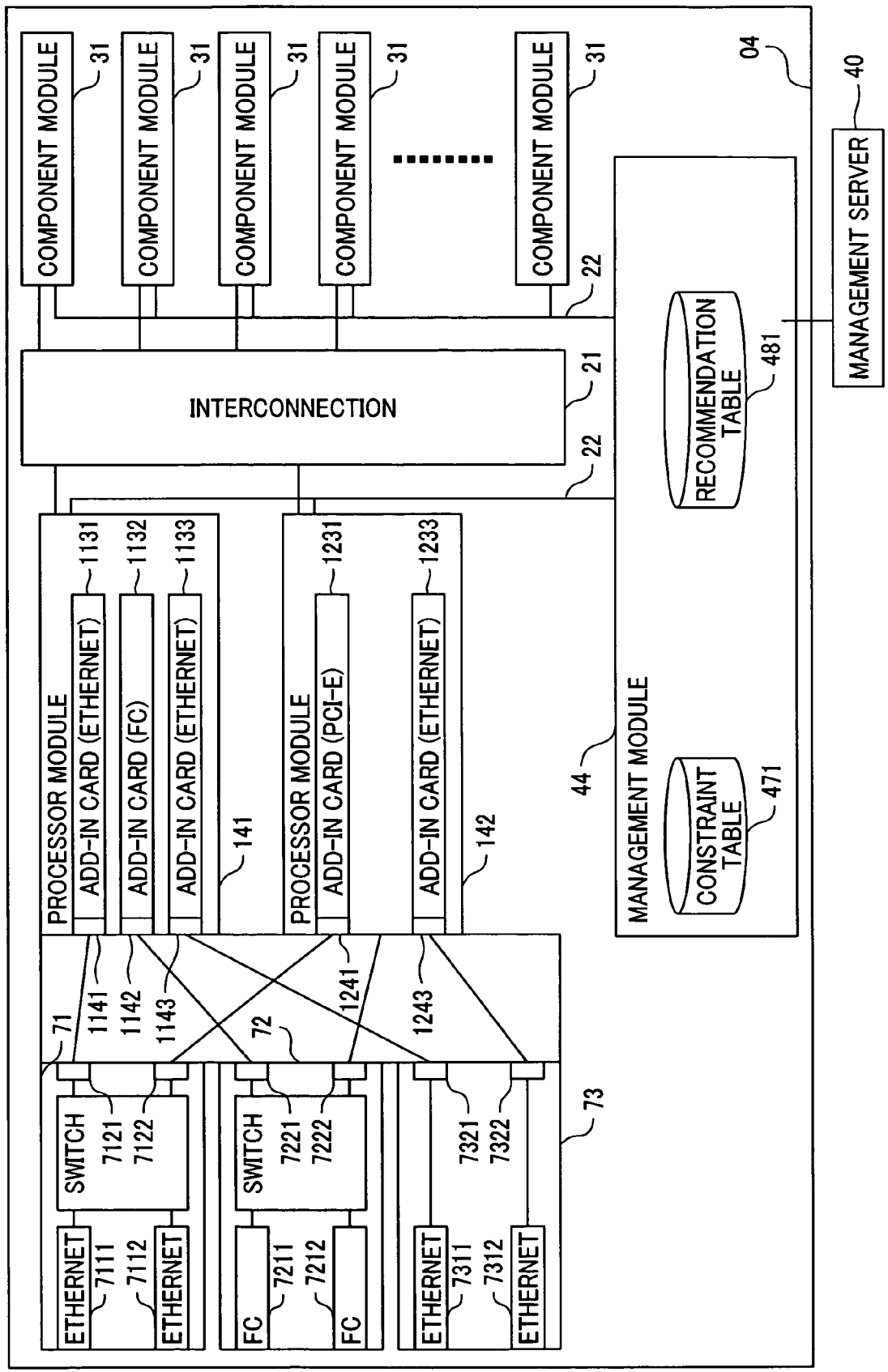
FIG. 25 shows a whole construction diagram of Embodiment 4 of the present invention.

FIG. 25 shows a whole diagram of Embodiment 4 in the present invention.

In Embodiment 4, there will be described a case where add-in cards can be added to a processor module 141 or 142. A compound computer machine 04 is constituted of the processor modules 141 and 142, interconnections 21 and 22, a component modules 31, a management module 44, and I/O modules 71 to 73. The processor module 141 has add-in cards 1131 to 1133 having internal ports 1141 and 1142, and another constitution of the module is the same as that of the processor module 11 in the compound computer machine 01. The processor module 142 has a constitution similar to that of the processor module 141, but is different in the presence of the second add-in card and a class of the first add-in card. The add-in cards 1131, 1133, and 1233 are cards for Ethernet (registered trademark), the add-in card 1132 is a card for a fiber channel (FC), and an add-in card 1231 is a card for PCI-Express. Input/output ports 1141, 1142, 1143, 1241, and 1243 attached to the add-in cards are common interfaces, and connected to internal ports 7121, 7122, 7221, 7222, 7321, and 7322 of the I/O modules 71 to 73. The I/O module 71 has the internal ports 7121 and 7122, output ports 7111 and 7112, and a switch. The ports 7111 and 7112 are Ethernet ports. The I/O module 72 has the internal ports 7121 and 7122, output ports 7211 and 7212, and a switch. The ports 7211 and 7212 are FC ports. The I/O module 73 has ports 7311 and 7312 as output ports. The ports 7211 and 7212 are Ethernet ports. The I/O module 73 is different from the I/O module 71 in that the module does not have any switch. There are constraints on the add-in cards and I/O modules. When the first add-in card of a certain processor module is the card for Ethernet, the corresponding I/O output port needs to be the port for Ethernet. When the first add-in card of another processor module corresponding to the port is not the card for Ethernet, any output cannot be transmitted from the output port of the I/O module. The management module 44 has a constraint table 471 as combination constraint information of the add-in card and the I/O module, and a recommendation table 481 as priority information. A management server 40 connected to the management module 44 exists outside the compound computer machine 04.

Figure 26:
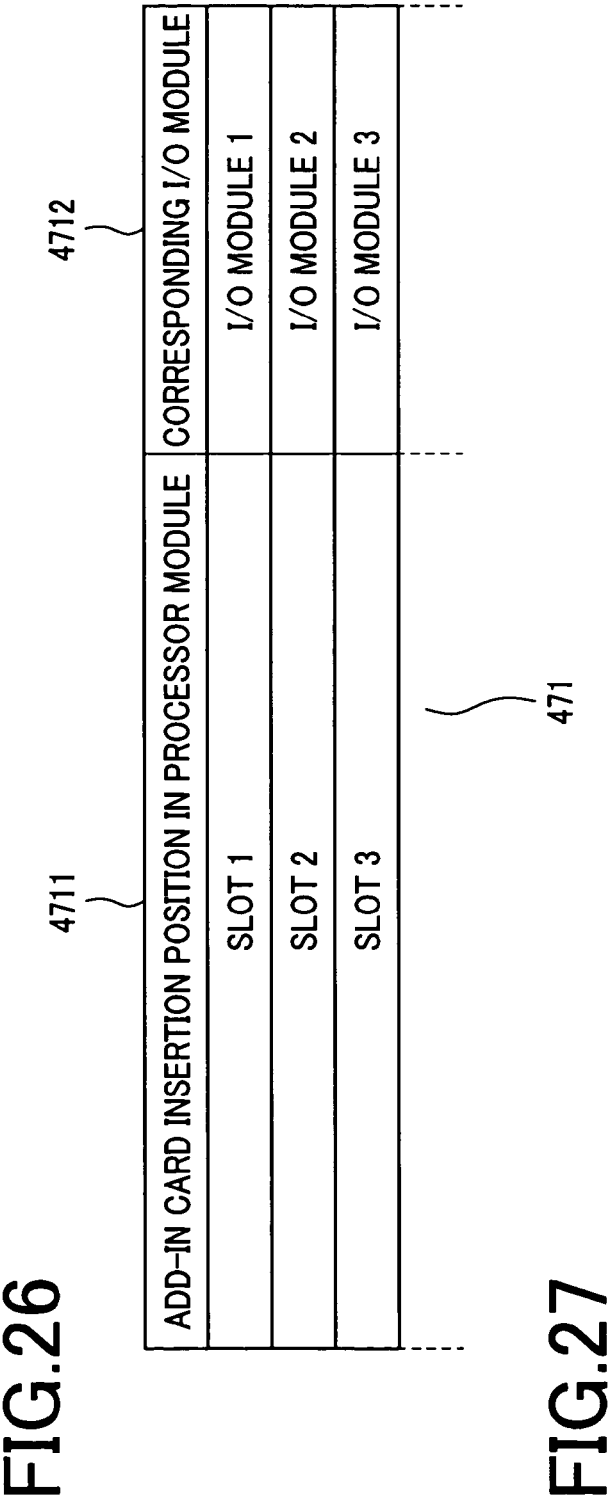
FIG. 26 shows combination constraint information in a management method according to Embodiment 4.

FIG. 26 shows the constraint table 471. The constraint table 471 has columns 4711 and 4712, and indicates constraints on the add-in card and the I/O module. The column 4711 indicates an add-in card insertion position in the processor module, and the column 4712 indicates the I/O module corresponding to the insertion position of each add-in card.

Figure 27:
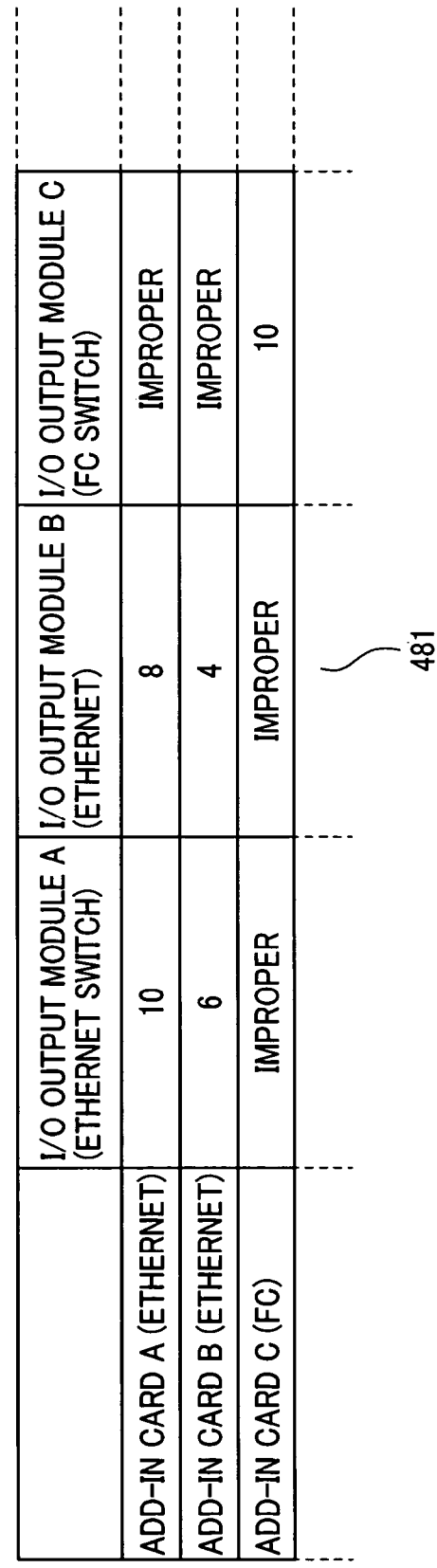
FIG. 27 shows priority information in the management method according to Embodiment 4.

FIG. 27 shows the recommendation table 481. The recommendation table 481 indicates priority information by a vendor of the management module 44, and indicates evaluation by compatibility of the I/O output port and the add-in card.

FIGS. 28 to 33 show examples concerning a management method in a case where there is not any change in the installation of the modules in Embodiment 4. FIGS. 34 to 39 show examples concerning a management method in a case where the module is additionally installed in Embodiment 4.

FIGS. 28 and 34 show data 941 and 951 indicating requests for the management module 44, respectively. The data 941 has columns 9411 to 9414, and indicates a request for associating the add-in card with the I/O module. The column 9411 shows serial numbers of the data 941. The column 9413 limits the module to be used for the request for the module construction. The column 9314 shows classes of the requests for the module constructions, and indicates no change in installation, addition, deletion, replacement or the like.

FIGS. 29 to 34 show data 942 and 952 indicating information of the installed processor module of the compound computer machine 04, respectively. The data 942 has columns 9421 to 9424. The column 9421 indicates the modules. The columns 9422 and the subsequent columns indicate the add-in cards inserted into the modules shown in the column 9421.

FIGS. 30 and 36 show data 943 and 953 indicating information of the installed I/O module of the compound computer machine 04. The data 943 has columns 9431 to 9434. The column 9431 indicates the modules. The columns 9432 shows classes of the modules shown in the column 9431. The column 9433 shows the presence of a switch function of each I/O module.

FIGS. 31 and 37 show candidate data 944 and 954 for the module constructions, generated by the management module 44, respectively. The data 944 has columns 9441 and 9442. The column 9441 shows numbers corresponding to those of the column 9411. The column 9442 shows a candidate for module construction.

FIGS. 32 and 38 show data 945 and 955 obtained by prioritizing the candidate data 944 and 954 for the module constructions, respectively. The data 945 has columns 9451 to 9453. The column 9451 shows numbers corresponding to those of the column 9411. The column 9452 shows candidates for module constructions. The column 9453 shows priority based on the recommendation table.

FIG. 33 shows a management method in Embodiment 4, and shows a flowchart from a time when the management module 44 receives the request data 941 until the module prepares the candidate data 945 with priority. On receiving the data 941, in a step 841, the management module 44 communicates with the modules installed in the compound computer machine 04 via the interconnection 22 to grasp the installation information, and prepares the data 942 and 943. On receiving the data 942 and 943, in a step 842, the management module 44 prepares the candidate data 944 for module construction with reference to the constraint table 471. On receiving the data 943, in a step 843, the management module 44 prepares the candidate data 945 for module construction with reference to the recommendation table 481, and reports that to the management server 40. When there is a response from the management server 40, the management module 44 receives an instruction for module construction by means of the response from the management server 40, and constructs the modules based on the response.

FIG. 39 shows a management method in Embodiment 4, and shows a flowchart from a time when the management module 44 receives the request data 951 until the module reports the prioritized candidate data 945 to the management server. On receiving the data 951, in a step 851, the management module 44 communicates with the modules installed in the compound computer machine 04 via the interconnection 22 to grasp the installation information, and prepares the data 952 and 953. On receiving the data 952 and 953, in a step 852, the management module 44 prepares the candidate data 954 for module construction with reference to the constraint table 471. On receiving the data 953, in a step 853, the management module 44 prepares the candidate data 955 for module construction with reference to the recommendation table 481, and reports that to the management server 40.

Consequently, the management module absorbs on the constructing of the extension processor module of the compound computer machine, so that the modules can be easily constructed.

The present invention developed by the present inventor has been described above in detail based on the embodiments, but the present invention is not limited to the embodiments, and needless to say, the present invention can be variously modified without departing from the scope.

A management method for constructing a computer machine by combining modules in a compound computer machine according to the present invention is suitable for enhancement of management properties of the computer machine.

The invention claimed is:

1. A compound computer machine comprising: a plurality of processor modules each including one or more processors and a processor module controller which controls the processors and which controls and monitors a power supply; a plurality of component modules as components of a computer machine which are combined with the one or more processor modules to construct the computer machine; and a management module which is connected to the processor module and the component module via an interface for management and which manages the processor module and the component module, or the processor module having the same function as that of the management module, or the component module having the same function as that of the management module, wherein the management module communicates with the processor module controller by use of the interface for management to acquire installation information of the processor module installed in the compound computer machine, and has the processor module installation information, the management module communicates with the component module by use of the interface for management to acquire installation information of the component module installed in the compound computer machine, and has the component module installation information, the management module controls combinations of the one or more processor modules and the one or more component modules to construct one computer machine, thereby constituting one or more computer machines in the whole compound computer machine, the management module has, as a constraint on a combination of constructions of the processor module and the component module, combination constraint information including at least one of information on propriety of connection via a physical combination of interfaces or the like, information on propriety of connection via a logical combination of interfaces or the like, and information on propriety of connection via a specification combination of product specification or the like, and the management module has at least one of:

a function of preparing combination candidate information of the processor module and the component module constructing the computer machine from the processor module installation information, the component module installation information, and the combination constraint information in a case where the processor module is combined with the component module to construct the computer machine;

a function of preparing addition-time installation position candidate information indicating a candidate for an installation position of the processor module or component module to be added in the compound computer machine from the processor module installation information, the component module installation information, and the combination constraint information in a case where the processor module or the component module is newly installed in the compound computer machine;

a function of preparing deletion-time installation position candidate information indicating a candidate for an installation position of the processor module or component module to be removed in the compound computer machine from the processor module installation information, the component module installation information, and the combination constraint information in a case where the processor module or the component module is removed from the compound computer machine; and a function of preparing a replacement-time installation position candidate information indicating a candidate for an installation position of the processor module or component module to be replaced in the compound computer machine from the processor module installation information, the component module installation information, and the combination constraint information in a case where the processor module or the component module is removed from the compound computer machine to install another processor module or component module, that is, the processor module or the component module is replaced.

2. The compound computer machine according to claim 1, wherein the management module has combination priority information indicating priority of combination with respect to the combination of the processor module and the component module, and the management module has at least one of:

a function of adding information on priority to the combination candidate information in a case where the processor module is combined with the component module to construct the computer machine by use of the combination priority information;

a function of adding information on priority to the addition-time installation position candidate information in a case where the processor module or the component module is newly installed in the compound computer machine;

a function of adding information on priority to the deletion-time installation position candidate information in a case where the processor module or the component module is removed from the compound computer machine; and a function of adding information on priority to the replacement-time installation position candidate information in a case where the processor module or the component module is removed from the compound computer machine to install another processor module or component module, that is, the processor module or the component module is replaced.

3. The compound computer machine according to claim 2, wherein the management module has the combination priority information including at least one of:

information on a degree of evaluation of combination validation of a vendor with respect to the combination of the processor module and the component module;

information on a performance of the computer machine constituted by combining the processor module and the component module;

information on machine temperature of the computer machine or the compound computer machine in a case where the processor module is combined with the component module; and information on an actual running time of the computer machine constituted by combining the processor module with the component module.

4. The compound computer machine according to claim 1, further comprising:

a user interface via which the management module manages the compound computer machine, the user interface having, as a function of managing the user interface, at least one of:

a function of outputting the combination candidate information in a case where the processor module is combined with the component module to construct the computer machine;

a function of outputting the addition-time installation position candidate information in a case where the processor module or the component module is newly installed in the compound computer machine;

a function of outputting the deletion-time installation position candidate information in a case where the processor module or the component module is removed from the compound computer machine; and a function of outputting the replacement-time installation position candidate information in a case where the processor module or the component module is removed from the compound computer machine to install another processor module or component module, that is, the processor module or the component module is replaced.

5. The compound computer machine according to claim 1, further comprising:

an interface for a management server via which the management module communicates with the management server for managing the compound computer machine or the like, the management module having at least one of:

a function of notifying the management server of the combination candidate information by use of the interface for the management server in a case where the processor module is combined with the component module to construct the computer machine;

a function of notifying the management server of the addition-time installation position candidate information by use of the interface for the management server in a case where the processor module or the component module is newly installed in the compound computer machine;

a function of notifying the management server of the deletion-time installation position candidate information by use of the interface for the management server in a case where the processor module or the component module is removed from the compound computer machine; and a function of notifying the management server of the replacement-time installation position candidate information by use of the interface for the management server in a case where the processor module or the component module is removed from the compound computer machine to install another processor module or component module, that is, the processor module or the component module is replaced.

6. The compound computer machine according to claim 1, capable of connecting processors of two or more processor modules to each other via a signal interconnection, and combining the two or more processor modules to construct a multiprocessor computer machine between the modules connected to each other via the processors in the processor modules, the management module communicating with the processor module controller by use of the interface for management, combining the two or more processor modules to construct the multiprocessor computer machine between the modules, and operating the component module as the processor module, wherein the management module has, as the combination constraint information, at least one of:

information on propriety of construction of the multiprocessor computer machine between the modules depending on an installation position of the processor module;

information on propriety of construction of the multiprocessor computer machine between the modules depending on a class of the processor module; and information on propriety of construction of the multiprocessor computer machine between the modules depending on a type of processor installed in the processor module.

7. The compound computer machine according to claim 1, further comprising:

an I/O module for an extension I/O card, having one or more slots for the extension I/O card, connectable to the extension I/O card, the slot for the extension I/O card being combined with the processor module via an I/O interface to construct a computer machine, the component module being constituted as the slot for the extension I/O card, wherein the management module has, as the combination constraint information, conversion information of a physical position of the slot for the extension I/O card and a logical position indicating an order of recognition of the slot for the extension I/O card of the computer machine.

8. The compound computer machine according to claim 1, further comprising:

one or more I/O add-in card for extension, installed in the processor module; and one or more I/O modules for connecting the processor module to an external communication device via I/O, the I/O add-in card for extension being connected to the I/O module via an interconnection for the I/O interface, the I/O add-in card for extension being combined with the I/O module to construct the I/O interface for a certain type of I/O protocol, wherein the management module communicates with the processor module controller by use of the interface for management to acquire installation information and classification information of the I/O add-in card for extension, and has the extension I/O add-in card installation information, the management module is connected to the I/O module via the interface for management, communicates by use of the interface for management, acquires installation information and classification information of the I/O module, and has the I/O module installation information, the component module being constituted as the I/O add-in card for extension and the I/O module, and the management module has, as the combination constraint information, at least one of: information on propriety of connection by a physical combination of the I/O add-in card for extension and the I/O module; and information on propriety of connection by a combination of the I/O add-in card for extension and the I/O module for each type of interface in the compound computer machine in which the component module is constituted as the I/O add-in card for extension and the I/O module.

9. A management server connected to a compound computer machine and having a management module which manages the compound computer machine, wherein the management module communicates with a processor module controller by use of an interface for management to acquire installation information of one or more processor modules installed in the compound computer machine, having the processor module installation information, the management module communicates with a component module by use of the interface for management to acquire installation information of the component module installed in the compound computer machine, and having the component module installation information, the management module controls combinations of one or more processor modules and one or more component modules to construct one computer machine, thereby constituting one or more computer machines in the whole compound computer machine, the management module has, as a constraint on a combination of constructions of the processor module and the component module, combination constraint information including at least one of information on propriety of connection via a physical combination of interfaces or the like, information on propriety of connection via a logical combination of interfaces or the like, and information on propriety of connection via a specification combination of product specification or the like, and the management module has at least one of:

a function of preparing combination candidate information of the processor module and the component module constructing the computer machine from the processor module installation information, the component module installation information, and the combination constraint information in a case where the processor module is combined with the component module to construct the computer machine;

a function of preparing addition-time installation position candidate information indicating a candidate for an installation position of the processor module or component module to be added in the compound computer machine from the processor module installation information, the component module installation information, and the combination constraint information in a case where the processor module or the component module is newly installed in the compound computer machine;

a function of preparing deletion-time installation position candidate information indicating a candidate for an installation position of the processor module or component module to be removed in the compound computer machine from the processor module installation information, the component module installation information, and the combination constraint information in a case where the processor module or the component module is removed from the compound computer machine; and a function of preparing a replacement-time installation position candidate information indicating a candidate for an installation position of the processor module or component module to be replaced in the compound computer machine from the processor module installation information, the component module installation information, and the combination constraint information in a case where the processor module or the component module is removed from the compound computer machine to install another processor module or component module, that is, the processor module or the component module is replaced.

10. A method of managing a compound computer machine comprising: one or more processors modules each including one or more processors and a processor module controller which controls the processors and which controls and monitors a power supply; one or more component modules as components of a computer machine which are combined with the one or more processor modules to construct the computer machine; and a management module which is connected to the processor module and the component module via an interface for management and which manages the processor module and the component module, or the processor module having the same function as that of the management module, or the component module having the same function as that of the management module, the management module communicating with the processor module controller by use of the interface for management to acquire installation information of the processor module installed in the compound computer machine, and having the processor module installation information, the management module communicating with the component module by use of the interface for management to acquire installation information of the component module installed in the compound computer machine, and having the component module installation information, the management module having a function of controlling combinations of the one or more processor modules and the one or more component modules to construct one computer machine, thereby constituting one or more computer machines in the whole compound computer machine, the management method including at least one of:

a management method in which the management module grasps information on the modules installed in the compound computer machine from the processor module installation information and the component module installation information, the management module prepares combination candidate information of the processor module and the component module constructing the computer machine from combination constraint information, as a constraint on a combination of constructions of the processor module and the component module, including at least one of information on propriety of connection via a physical combination of interfaces or the like, information on propriety of connection via a logical combination of interfaces or the like, and information on propriety of connection via a specification combination of product specification or the like, and the management module adds information on priority to the combination candidate information, when the management module has combination priority information indicating a combination priority with respect to the combination of the processor module and the component module, in a case where the processor module is combined with the component module to construct the computer machine;

a management method in which the management module grasps the information on the modules installed in the compound computer machine from the processor module installation information and the component module installation information, the management module prepares addition-time installation position candidate information indicating a candidate for an installation position of the processor module or component module to be added in the compound computer machine from the combination constraint information, and the management module adds the information on priority to the addition-time installation position candidate information, when the management module has the combination priority information, in a case where the processor module or the component module is newly installed in the compound computer machine;

a management method in which the management module grasps the information on the modules installed in the compound computer machine from the processor module installation information and the component module installation information, the management module prepares deletion-time installation position candidate information indicating a candidate for an installation position of the processor module or component module to be removed in the compound computer machine from the combination constraint information, and the management module adds the information on priority to the deletion-time installation position candidate information, when the management module has the combination priority information, in a case where the processor module or the component module is removed from the compound computer machine; and a management method in which the management module grasps the information on the modules installed in the compound computer machine from the processor module installation information and the component module installation information, the management module prepares replacement-time installation position candidate information indicating a candidate for an installation position of the processor module or component module to be replaced in the compound computer machine from the combination constraint information, and the management module adds the information on priority to the replacement-time installation position candidate information, when the management module has the combination priority information, in a case where the processor module or the component module is removed from the compound computer machine to install another processor module or component module, that is, the processor module or the component module is replaced.

11. The method of managing the compound computer machine according to claim 10, wherein the management module has the combination priority information including at least one of:

information on a degree of evaluation of combination validation of a vendor with respect to the combination of the processor module and the component module;

information on a performance of the computer machine constituted by combining the processor module and the component module;

information on machine temperature of the computer machine or the compound computer machine in a case where the processor module is combined with the component module; and information on an actual running time of the computer machine constituted by combining the processor module with the component module.

12. A method of managing the compound computer machine according to claim 10, the compound computer machine further comprising:

a user interface via which the management module manages the compound computer machine, the user interface having, as a managing function, at least one of:

a management method of preparing and outputting the combination candidate information by the method of managing the compound computer machine according to claim 10 in a case where the processor module is combined with the component module to construct the computer machine;

a management method of preparing and outputting the addition-time installation position candidate information by the method of managing the compound computer machine according to claim 10 in a case where the processor module or the component module is newly installed in the compound computer machine;

a management method of preparing and outputting the deletion-time installation position candidate information by the method of managing the compound computer machine according to claim 10 in a case where the processor module or the component module is removed from the compound computer machine; and a management method of preparing and outputting the replacement-time installation position candidate information by the method of managing the compound computer machine according to claim 10 in a case where the processor module or the component module is removed from the compound computer machine to install another processor module or component module, that is, the processor module or the component module is replaced.

13. The method of managing the compound computer machine according to claim 10, the compound computer machine further comprising:

an interface for a management server via which the management module communicates with the management server for managing the compound computer machine or the like, the management module having at least one of:

a management method of preparing the combination candidate information by the method of managing the compound computer machine according to claim 10, and notifying the management server of the combination candidate information by use of the interface for the management server in a case where the processor module is combined with the component module to construct the computer machine;

a management method of preparing the addition-time installation position candidate information by the method of managing the compound computer machine according to claim 10, and notifying the management server of the addition-time installation position candidate information by use of the interface for the management server in a case where the processor module or the component module is newly installed in the compound computer machine;

a management method of preparing the deletion-time installation position candidate information by the method of managing the compound computer machine according to claim 10, and notifying the management server of the deletion-time installation position candidate information by use of the interface for the management server in a case where the processor module or the component module is removed from the compound computer machine; and a management method of preparing the replacement-time installation position candidate information by the method of managing the compound computer machine according to claim 10, and notifying the management server of the replacement-time installation position candidate information by use of the interface for the management server in a case where the processor module or the component module is removed from the compound computer machine to install another processor module or component module, that is, the processor module or the component module is replaced.

14. The method of managing the compound computer machine according to claim 10, the method being capable of connecting processors of two or more processor modules to each other via a signal interconnection, and combining the two or more processor modules to construct a multiprocessor computer machine between the modules connected to each other via the processors in the processor modules, the management module communicating with the processor module controller by use of the interface for management, combining the two or more processor modules to construct the multiprocessor computer machine between the modules, and operating the component module as the processor module, wherein the management module has, as the combination constraint information, at least one of:

information on propriety of construction of the multiprocessor computer machine between the modules depending on an installation position of the processor module;

information on propriety of construction of the multiprocessor computer machine between the modules depending on a class of the processor module; and information on propriety of construction of the multiprocessor computer machine between the modules depending on a type of processor installed in the processor module.

15. The method of manufacturing the compound computer machine according to claim 10, the compound computer machine further comprising:

an I/O module for an extension I/O card, having one or more slots for the extension I/O card, connectable to the extension I/O card, the slot for the extension I/O card being combined with the processor module via an I/O interface to construct a computer machine, the component module being constituted as the slot for the extension I/O card, wherein the management module has, as the combination constraint information, conversion information of a physical position of the slot for the extension I/O card and a logical position indicating an order of recognition of the slot for the extension I/O card of the computer machine.

16. The method of managing the compound computer machine according to claim 10, the compound computer machine further comprising:

one or more I/O add-in card for extension, installed in the processor module; and one or more I/O modules for connecting the processor module to an external communication device via I/O, the I/O add-in card for extension being connected to the I/O module via an interconnection for the I/O interface, the I/O add-in card for extension being combined with the I/O module to construct the I/O interface for a certain type of I/O protocol, wherein the management module communicates with the processor module controller by use of the interface for management to acquire installation information and classification information of the I/O add-in card for extension, and has the extension I/O add-in card installation information, the management module is connected to the I/O module via the interface for management, communicates by use of the interface for management, acquires installation information and classification information of the I/O module, and has the I/O module installation information, the component module being constituted as the I/O add-in card for extension and the I/O module, and the management module has, as the combination constraint information, at least one of: information on propriety of connection by a physical combination of the I/O add-in card for extension and the I/O module; and information on propriety of connection by a combination of the I/O add-in card for extension and the I/O module for each type of interface in the compound computer machine.

17. The method of managing the compound computer machine according to claim 10, wherein all or a part of the combination constraint information present in the management module is updated at a time when the compound computer machine is shipped or firmware of the management module is updated.

* * * * *